(12) United States Patent
Hofmann et al.

(10) Patent No.: US 9,498,800 B2
(45) Date of Patent: *Nov. 22, 2016

(54) DEVICE AND METHOD FOR REMOVING IMPURITIES FROM SHREDDED PLASTIC

(75) Inventors: Michael Hofmann, Hamburg (DE); Alexander Gercke, Bad Oldesloe (DE); Carsten Wermter, Hamburg (DE)

(73) Assignee: CVP Clean Value Plastics GmbH, Buxtehude (DE)

( * ) Notice: Subject to any disclaimer, the term of this patent is extended or adjusted under 35 U.S.C. 154(b) by 154 days.

This patent is subject to a terminal disclaimer.

(21) Appl. No.: 14/234,061

(22) PCT Filed: Jul. 13, 2012

(86) PCT No.: PCT/EP2012/002944
§ 371 (c)(1),
(2), (4) Date: Feb. 27, 2014

(87) PCT Pub. No.: WO2013/010654
PCT Pub. Date: Jan. 24, 2013

(65) Prior Publication Data
US 2015/0040946 A1 Feb. 12, 2015

(30) Foreign Application Priority Data
Jul. 21, 2011 (DE) .......... 10 2011 108 062

(51) Int. Cl.
| | |
|---|---|
| B08B 7/04 | (2006.01) |
| B08B 3/14 | (2006.01) |
| B29B 17/02 | (2006.01) |
| B29B 17/04 | (2006.01) |
| B08B 3/10 | (2006.01) |
| B08B 1/00 | (2006.01) |
| B08B 3/00 | (2006.01) |
| B08B 3/02 | (2006.01) |
| B08B 3/04 | (2006.01) |
| B29L 7/00 | (2006.01) |
| B29K 67/00 | (2006.01) |
| B29K 105/00 | (2006.01) |
| B29K 105/26 | (2006.01) |
| B29L 31/00 | (2006.01) |

(52) U.S. Cl.
CPC . B08B 3/14 (2013.01); B08B 3/10 (2013.01); B29B 17/02 (2013.01); B29B 17/0412 (2013.01); B08B 1/005 (2013.01); B08B 3/00 (2013.01); B08B 3/02 (2013.01); B08B 3/04 (2013.01); B29B 2017/0217 (2013.01); B29B 2017/0289 (2013.01); B29B 2017/0484 (2013.01); B29K 2067/003 (2013.01); B29K 2105/251 (2013.01); B29K 2105/26 (2013.01); B29L 2007/008 (2013.01); B29L 2031/712 (2013.01); Y02W 30/622 (2015.05); Y02W 30/625 (2015.05)

(58) Field of Classification Search
CPC .......... B29B 17/02; B29B 2017/0289; B29B 17/0412; B29L 2007/0008; B29L 2007/008; B08B 1/005; B08B 3/00; B08B 3/02; B08B 3/04; B08B 3/14; B08B 3/10
See application file for complete search history.

(56) References Cited

U.S. PATENT DOCUMENTS

| | | | |
|---|---|---|---|
| 1,744,226 A | 1/1930 | Hussey | |
| 4,712,745 A | 12/1987 | Leith | |
| 7,757,974 B2 * | 7/2010 | Hofmann | ............... B29B 17/02 241/20 |
| 8,328,124 B2 * | 12/2012 | Gingras | ................ D21D 1/306 241/24.29 |
| 2008/0191069 A1 | 8/2008 | Hofmann et al. | |
| 2012/0012685 A1 | 1/2012 | Gingras | |

FOREIGN PATENT DOCUMENTS

| | | |
|---|---|---|
| CA | 2746923 A1 * | 7/2010 |
| DE | 10 2005 013 693 A1 | 9/2006 |
| EP | 1 868 786 B9 | 10/2008 |
| EP | 2 077 352 A1 | 7/2009 |
| WO | 2008/058750 A2 | 5/2008 |

* cited by examiner

Primary Examiner — Bibi Carrillo
Assistant Examiner — Sharidan Carrillo
(74) Attorney, Agent, or Firm — Vidas, Arrett & Steinkraus, P.A.

(57) ABSTRACT

A device for removing impurities from shredded plastic has a first and second cleaning disk with first and second cleaning surfaces, the cleaning surfaces are opposite each other and delimit a cleaning gap. A drive device rotates the cleaning disks, and shredded plastic is fed between the cleaning disks. The cleaning surfaces have a plurality of cleaning ribs extending between an inner and outer edge of the cleaning surfaces, wherein at least one flank of the cleaning ribs is angled or curved relative to the axial direction of the respective cleaning disk, and a plurality of cleaning bars running transversally to the direction of extension of the cleaning ribs are arranged between at least some cleaning ribs neighboring each other.

8 Claims, 3 Drawing Sheets

DEVICE AND METHOD FOR REMOVING IMPURITIES FROM SHREDDED PLASTIC

CROSS-REFERENCE TO RELATED APPLICATIONS

This is a national stage application of PCT/2012/002944, filed on Jul. 13, 2012, claiming priority to DE 10 2011 108 062.0, filed on Jul. 21, 2011

STATEMENT REGARDING FEDERALLY SPONSORED RESEARCH

Not applicable.

BACKGROUND OF THE INVENTION

The invention relates to a device for removing impurities from shredded plastic comprising a first cleaning disk with a first cleaning surface, and a second cleaning disk with a second cleaning surface, wherein the cleaning surfaces are opposite each other and delimit a cleaning gap between each other, furthermore comprising a drive device by means of which at least one of the cleaning disks is rotatable about its rotational axis, and a feed device by means of which the shredded plastic can be fed between the cleaning disks. The invention also relates to a method for removing impurities from shredded plastic by means of such a device.

Plastic waste such as PET beverage bottles, blister packages made of PET (deep-drawn PET films), plastic waste consisting of polyolefins or the like must be cleaned during recycling. Very high quality requirements must be satisfied. The permissible impurities fluctuate within the ppm range. For cleaning, the plastic waste is first comminuted into shredded plastic, in particular so-called plastic flakes. A requirement for the cleaning process and continuous feeding of a cleaning system is shredded plastic that has been optimally comminuted beforehand. In particular, the shredded plastic should be generated as evenly as possible with a small amount of fines. It is known to use a shredder for this (a rotor with blades and opposing blades and a strainer basket). The generated flake size is influenced by the hole diameter in the strainer basket. Metals are removed from the plastic waste while pre-sorting with magnetic and eddy current separators. In the prior art, sorting according to colors and/or plastic types occurs before the comminution of the plastic waste. This is, however, associated with restrictions due to the contamination of the plastic waste since the identification rate of contaminated materials is less than with clean materials. Furthermore, several washing lines need to be operated when sorting before cleaning in order to clean the individual fractions. It is, however, also possible to first initially comminute plastic waste of different colors and/or different plastic types and then clean it, and only perform the sorting by colors and/or plastic types at the end of the process by means of color recognition, or respectively NIR, laser or x-ray spectroscopy. This can be done in an incident light process and/or a transillumination process with a suitable optical detector device (camera).

When recycling plastic flakes, in particular PET flakes, the following requirements must be satisfied:
1. Removal of film and cellulose labels
2. Removal of cellulose
3. Cleaning contamination from contents from the flakes (such as beverage residue)
4. Cleaning adhering contaminants from the flakes (such as adhesives from labels)
5. Removal of metals (such as tin plate and aluminum cans)
6. Removal of foreign plastic particles
7. Sorting according to color (such as clear PET and colored PET).

Similar requirements (however with higher thresholds) apply to the mechanical recycling of plastics. However, sorting according to color is generally omitted.

A method for removing celluloses and other adhering materials while recycling waste plastic, especially mixed plastic, is known from WO 2008/058750 A2. A toothed disk mill can be used with disks that have engaging teeth which are arranged spaced on concentric circles. Between the teeth of a circle, the gaps are large enough for pieces consisting of thicker or solid material to pass through freely. A disk mill is also known from DE 10 2005 013 693 A1.

However, sufficient cleaning of the impurities from the plastic waste is not always achieved in practice. This holds true in particular for the cleaning of flat shredded plastic. With such flat shredded plastic or flakes, folding can occur during cleaning so that only the outer surfaces are clean whereas the insides remain dirty.

On the basis of the above-explained prior art, an object of the invention is to provide a device and a method of the initially cited type by means of which improved cleaning of shredded plastic is achieved.

SUMMARY OF THE INVENTION

For a device of the initially cited type, the invention achieves the object in that the cleaning surfaces of the cleaning disks each have a plurality of cleaning ribs extending between an inner and outer edge of the cleaning surfaces, wherein at least one flank of the cleaning ribs is angled or curved relative to the axial direction of the respective cleaning disk, and that a plurality of cleaning bars running transversally to the direction of extension of the cleaning ribs are arranged between at least some cleaning ribs adjacent to each other.

As noted above, the device serves to clean shredded plastic. As also noted above, the shredded plastic arises from the comminution of plastic waste, such as plastic packages like beverage bottles, etc. The shredded plastic comprises previously comminuted flat plastic waste which can exist in the form of flakes (thin-walled hard plastics, films, etc.) or in the form of plastic chunks (thick-walled hard plastics) with a largely defined size. As also noted above, the impurities to be removed can in particular be surface adhesions such as residual cellulose, residual adhesive, residual labeling or organic contaminants.

The device according to the invention possesses a first and second cleaning disk. The first and second cleaning disks can each have a (hollow) cylindrical basic shape. The cleaning surfaces facing each other can each be circular.

The cleaning surfaces can be arranged over each other so that the cleaning surfaces each lie in a horizontal plane. The rotational axis of the at least one rotatably driven cleaning disk can simultaneously be its axis of symmetry. The rotational axis can run in a vertical direction. The drive can be an electric drive. The feed device can introduce the shredded plastic centrally between the cleaning disks. The shredded plastic can then be conveyed from inside to outside through the cleaning gap, cleaned in the process, and be discharged out of the cleaning gap.

The cleaning disks of the device according to the invention have cleaning ribs that run between the inner and outer edge of the cleaning surfaces, or respectively the cleaning disks. The ribs can in particular be designed continuous, i.e., without interruptions in their direction of extension. To the extent that the cleaning surfaces, or respectively cleaning disks, are closed in the region of their center, the cleaning ribs run between the center and an outer edge of the cleaning surfaces or cleaning disks. The cleaning ribs can run straight or be curved. They can furthermore run in the radial direction over the respective cleaning surface. It is however also possible for them to be angled or curved relative to the radial direction. At least one of the flanks of the cleaning ribs is curved or angled according to the invention relative to the axis of symmetry, or respectively the rotational axis of the respective cleaning disk. The corresponding flanks can hence each lie in a flat or curved surface. As noted, the axes of the cleaning disks can each run in a vertical direction. It is also possible for the two flanks of the cleaning ribs to be curved or angled relative to the axis of symmetry of the respective cleaning disk. Furthermore, cleaning bars are arranged according to the invention between at least some, in particular all, cleaning ribs running adjacent to each other. They run perpendicular to the direction of extension of the cleaning ribs. They can run vertically to the direction of extension of the cleaning ribs. However, they can also run in a direction transversally to the direction of extension of the cleaning ribs at an angle less or greater than 90° to the direction of extension of the cleaning ribs.

The invention is based on the awareness that it is very important to clean the shredded plastic without strong mechanical stress from compression, or respectively deformation, when processing shredded plastic, in particular plastic flakes. Improved cleaning of the shredded plastic is achieved by reducing the mechanical stress (compression). In particular, folding or snarling the shredded plastic is avoided. The surfaces of the shredded plastic with the adhered components therefore remains accessible to cleaning. In addition, smooth shredded plastic has a greater bulk weight and does not tend to interlock, thus improving its conveyability. In addition, smooth shredded plastic is easier to sort, in particular in sorting devices in which the shredded plastic falls from top to bottom under the effect of gravity. Accordingly, smooth shredded plastic forms a uniform "shredded plastic curtain". Finally, the generation of a fines portion is prevented by the reduction of mechanical stress.

It has been revealed that the geometry of the cleaning disks according to the invention, in particular the inclination or respectively curvature, of at least one of the flanks of the cleaning ribs yields such a reduced mechanical stress. Given the geometry of the cleaning disks according to the invention, the shredded plastic is drawn between the disks, in particular between the cleaning ribs. Kinking, or respectively folding or snarling of the shredded plastic is avoided. Ideally, a single-grain layer of shredded plastic exists between the cleaning disks, thus enabling surface impurities to be optimally cleaned from the shredded plastic. The surface of the cleaning ribs generates the necessary friction to clean the shredded plastic. In particular, given the cleaning disk geometry according to the invention, basically the entire surface of the shredded plastic is abraded, whereby all adhering contaminants are released. The addition of chemicals such as sodium hydroxide solution as is frequently necessary for cleaning in the prior art, is unnecessary according to the invention. Instead, the geometry of the cleaning disks according to the invention, or respectively the cleaning surfaces, results in sufficient cleaning of the shredded plastic without comminution of the shredded plastic occurring, or respectively necessarily occurring.

Furthermore, given the geometry according to the invention, the shredded plastic is stretched slightly and thus pulled flat, and any folded shredded plastic (for example from initial comminution) is unfolded. In particular, it has been revealed that the majority of friction for abrading and hence cleaning the shredded plastic in the device according to the invention occurs in the region of the angled, or respectively curved flanks of the cleaning ribs. As mentioned, the corresponding flank does not necessarily have to lie in a flat plane. Instead, the flank can be curved, thus yielding a soft transition to the peak surface. It is important for the cleaning ribs to have a sufficiently large friction surface to produce a sufficient cleaning effect. The cleaning bars arranged in the channels between cleaning ribs according to the invention function as barriers and force the shredded plastic between the cleaning ribs, in particular between the cleaning ribs of the cleaning disks.

The abrasion of the shredded plastic achieved by the device according to the invention has an additional advantageous effect beyond cleaning. The shredded plastic is thereby provided with a matte surface which reflects light less strongly. This makes it easier to optically sort the shredded plastic following the cleaning process. With optical sorting devices that function according to the incident light method for recognizing color, a highly glossy and hence reflecting surface is disadvantageous. Improved recognition of the shredded plastic is achieved by the abrasion of the shredded plastic according to the invention.

It should also be noted that the shredded plastic according to the invention comprises in particular flat plastic particles. In particular with plastic that is less tough such as HDPE, a certain percentage of thicker plastic particles can also be obtained that are cleaned with the device according to the invention.

The cleaning disks designed in the manner according to the invention with the relatively wide cleaning ribs from the angled, or respectively curved surfaces, wear more slowly during operation than conventional cleaning disks. In addition, the arrangement according to the invention of the angled, or respectively curved flanks of the cleaning ribs generates a pumping effect together with the relative rotational movement between the cleaning disks. The shredded plastic to be cleaned is conveyed through the cleaning gap and cleaned solely due to the geometry of the cleaning disks and the relative rotational movement. A solids pump with an associated pump sump as is frequently provided in the prior art can therefore be discarded.

According to one embodiment, the angled or curved flanks of the cleaning ribs of the first and/or second cleaning disk can be the leading flanks of at least one cleaning disk during a rotation. With the cleaning disk which is not rotationally driven, the leading flank of the cleaning ribs is the leading flank during the relative rotation between the cleaning disks. With this design, the abrasion of the shredded plastic, and hence the cleaning according to the invention, is performed in a particularly effective manner.

The degree of inclination, or respectively curvature of the flanks according to the invention largely depends on the type of plastic to be cleaned, the shape of the shredded plastic, and the size distribution within the quantity of shredded plastic to be cleaned. It is decisive that a comminution, or respectively compression of the shredded plastic scarcely occurs. At the same time, the shredded plastic must be subject to a friction that is sufficient for cleaning. There hence must be sufficient space between the facing flanks of the adjacent cleaning ribs to accommodate the shredded plastic to be cleaned. With flat shredded plastic, flanks with a greater angle of inclination, or respectively angle of curvature, relative to the axial direction is suitable. In particular, the shredded plastic is drawn particularly effectively between the cleaning disks with a gradually sloping flank. In addition, a large abrasion surface is available, thus yielding a particularly favorable cleaning effect. With chunky shredded plastic, a smaller angle of inclination, or respectively angle of curvature, relative to the axial direction is suitable. It is for example possible for the angled flanks of the cleaning ribs of the first and/or second cleaning disk to each possess an angle of inclination of at least 10°, preferably at least 30%, and more preferably at least 45°, relative to the axial direction of the respective cleaning disk. If the flanks of the cleaning ribs are curved, a line connecting the beginning and end of the curved flanks can possess an angle of inclination of at least 10°, preferably at least 30%, and more preferably at least 45° relative to the axial direction of the respective cleaning disk in a sectional plane viewed perpendicular to the direction of extension of the cleaning ribs of the first and/or second cleaning disk. The upper limits for the cited angles can for example be at least 45°, preferably at least 60°, and more preferably at least 80°.

According to another embodiment, the cleaning ribs of the first and/or second cleaning disk can form a sawtooth profile in a peripheral direction around the center of the respective cleaning disk, or the respective cleaning surface (in each case). The cleaning ribs can form a cross-sectional sawtooth profile in the peripheral direction, i.e., for example along one or more circular or other type of paths with different radii around the center of the cleaning disk, or respectively the cleaning surface. The cleaning ribs can therefore basically transition directly into each other viewed in a peripheral direction. This prevents (horizontal) base surfaces between the adjacent cleaning ribs in which the shredded plastic may undesirably collect.

According to another embodiment, the cleaning ribs of the first and/or second cleaning disk can be rounded, at least at the transition between their at least one angled or curved flank and their peak surface. Furthermore, the cleaning ribs of the first and/or second cleaning disk can possess a horizontal peak surface. Of course, the cleaning ribs can also be rounded at the transition to a second flank which is possibly not angled or curved. Since there is no sharp edge and in particular no sharp burr formed at the transition between the flank and the peak surface, a curling of the shredded plastic is avoided. Instead, the rounding and horizontal peak surface ensures that the shredded plastic is drawn between the cleaning disks and cleaned there in an unfolded, flat state.

The cleaning bars of the first and/or second cleaning disk can rise in a ramp-like manner in the radial direction of the cleaning disk, i.e., in particular from inside to outside. This embodiment causes the shredded plastic to be drawn into the processing area between the cleaning disks in a particularly effective manner. According to another embodiment, the cleaning bars of the first cleaning disk can possess a lower height than the cleaning ribs of the first cleaning disk, and/or the cleaning bars of the second cleaning disk can possess a lower height than the cleaning ribs of the second cleaning disk. In this embodiment, the shredded plastic is processed more gently between the cleaning disks since not all of the shreds are forced between the disks at each cleaning bar. In particular, flakes that have a greater wall thickness than the cleaning gap between the cleaning ribs can slide through the resulting gap without being abraded by the cleaning ribs.

Another embodiment can provide a clearance between the peak surfaces of the cleaning ribs of the first cleaning surface and the peak surfaces of the cleaning ribs of the second cleaning surface, which clearance substantially corresponds to the average thickness of the shredded plastic, in particular of the primary grain class, fed by means of the feed device. The clearance between the cleaning disks, and hence the thickness of the cleaning gap, is accordingly adapted to the thickness of the average anticipated plastic shreds. The clearance between the disks should, if possible, be adjusted so that only individual plastic shreds can pass between the disks. This results in optimum cleaning by abrasion of the top and bottom sides of the plastic shreds. It is also advantageous when the shredded plastic to be cleaned has a very narrow variation in thickness. If a variation in thickness exists, the height of the cleaning bars can be selected so that the clearance between the opposing cleaning bars corresponds to the average thickness of the thickest plastic shreds when the cleaning disks are in a state of operation. The attainment of the optimum threshold thickness of the cleaning gap can be determined by the power consumption of the drive device. The power consumption jumps suddenly when the threshold thickness is low. A cleaning gap of 0.25 mm for the processing of PET bottles made of disposable systems, a cleaning gap of 0.50 mm for the processing of PET reusable bottles (thicker wall), and a cleaning gap of 0.1 mm for processing film shreds are cited as examples. The respective suitable clearance must be determined and adapted depending on the material.

The first and/or second cleaning disk can in principle be designed as a single part, or consist of a plurality of cleaning disk segments. The device can furthermore have a liquid feed device by means of which liquid, in particular water or an aqueous solution, can be fed into the cleaning gap. The liquid feed serves to convey the shredded plastic through the cleaning gap and remove the abraded material that arises during the cleaning process. A hydrodynamic process is generated by the geometry of the cleaning disks according to the invention. Turbulence arises in the water flow that in turn generates very high flow speeds of the liquid through the cleaning gap. The shredded plastic to be cleaned is pressed very strongly against the cleaning ribs, in particular the angled or respectively curved flanks and the peak surfaces. This improves the cleaning of the shredded plastic. With the device according to the invention, there is no specified minimum solid concentration (ratio of the amount of solids, in particular amount of shredded plastic, to the amount of liquid). Low solid concentrations are also feasible with the device according to the invention. In particular, solid concentrations of less than 10% can be used. The maximum solid concentration depends on the degree of contamination, or respectively the maximum processing capacity, of the employed cleaning disk. The maximum solid concentration can be increased by using larger cleaning disks. The utilized amount of liquid is adapted to the degree of contamination of the shredded plastic that is to be cleaned and that is generated in the process.

According to another embodiment, the cleaning bars of the first and second cleaning disk can be arranged so that they do not assume, or do not permanently assume, directly opposing positions while the at least one cleaning disk rotates. Furthermore, the cleaning bars can be arranged on the first and second cleaning surface along several circular paths around the center of the respective cleaning disk, or the respective cleaning surface. The circular paths of the cleaning bars on the first cleaning surface can possess different radii than the circular paths of the cleaning bars on the second cleaning surface. It can furthermore be provided that the cleaning bars are arranged along a circular path between each pair of adjacent cleaning ribs. The circular paths on a cleaning disk are in particular concentric to each other. The center of the cleaning surface can be identical to the center of the cleaning disk. As noted, the cleaning surface can for example be circular, whereas the cleaning disk can for example be a (hollow) cylinder. Different radii of the circular paths on the first and second cleaning disk ensure that the cleaning bars do not directly oppose each other during the relative rotation of the cleaning disks. This reduces the mechanical stress on the shredded plastic. The cleaning disks can hence be designed different from each other. They can however both possess directly opposing circular paths with cleaning bars having an identical radius along their outer and/or inner edge.

It is alternately also possible for the cleaning surfaces of the upper and lower cleaning disk to be designed identical to each other. At least some of the circular paths on the first cleaning surface and the circular paths on the second cleaning surface can have the same radius, wherein at least the cleaning bars along circular paths with the same radius are in each case arranged only between each second pair of adjacent cleaning ribs. In particular, all the circular paths on the first cleaning surface and the circular paths on the second cleaning surface can have the same radius, and furthermore in particular the cleaning bars along circular paths with the same radius are in each case arranged only between each second pair of adjacent cleaning ribs. An alternating arrangement is thereby provided, wherein the cleaning bars are only provided in each second channel between adjacent cleaning ribs. When the cleaning disks rotate relative to each other, the cleaning bars are directly opposed for 50% of the processing time. Whereas this embodiment possesses advantages in terms of the production costs of the cleaning disks, it leads to greater stress on the shredded plastic. It is in particular highly suitable for very thin shredded plastic (plastic film shreds).

The invention also relates to a method for removing impurities from shredded plastic using a device according to the invention, wherein at least one cleaning disk is rotationally driven about its rotational axis by means of the drive device, wherein liquid, in particular water or an aqueous solution, is fed into the cleaning gap by means of the liquid feed device, wherein shredded plastic is fed into the cleaning gap by means of the feed device, and wherein the shredded plastic is conveyed through the cleaning gap. The conveyance of the shredded plastic through the cleaning gap occurs from the relative rotation of the cleaning disks to each other and from the supply of liquid.

In the method according to the invention, previously comminuted plastic waste in the form of shredded plastic (flakes) is added to the device. The shredded plastic is cleaned by specific disk friction in the above-described manner, wherein the amount of friction can be adjusted by regulating the cleaning disk clearance. A suspension is created with components comprising the fed liquid such as water, the cleaned shredded plastic, and the substances abraded therefrom (such as adhesive, cellulose, labels, organic contaminants, etc.). After cleaning, the suspension with the impurities is separated from the cleaned shredded plastic.

It can be provided according to another embodiment that the shredded plastic to be cleaned is subject to preliminary cleaning in a cleaning device before being fed between the cleaning disks and conveyed through the cleaning gap of the device actually provided for removing impurities. The cleaning device possesses a first cleaning disk with a first cleaning surface, and a second cleaning disk with a second cleaning surface, wherein the cleaning surfaces oppose each other and delimit a cleaning gap between each other that is greater than the cleaning gap of the device subsequently used to remove impurities from the shredded plastic. As with the primary cleaning following the device, at least one of the cleaning disks can be rotated about its rotational axis; liquid, in particular water or an aqueous solution, can be fed into the cleaning gap of the preliminary cleaning device; and the shredded plastic to be cleaned can be conveyed between the cleaning disks of the preliminary cleaning device and through the cleaning gap. A two-step cleaning process therefore occurs.

In principle, the preliminary cleaning device can be designed largely identical to the subsequently used primary cleaning device. It can, however, be dimensioned smaller. Since the cleaning gap of the preliminary cleaning device is larger than that of the primary cleaning device, it can result in only slight or basically no abrasive processing of the shredded plastic. In particular, the cleaning gap of the preliminary cleaning device is selected by adjusting the clearance between the cleaning disks so that impurities removed from the shredded plastic during the preliminary cleaning, such as removed cellulose, are basically not destroyed. This makes it significantly easier to subsequently clean the shredded plastic in the primary cleaning device.

It is also possible to subject the shredded plastic to be cleaned to a preliminary cleaning in a preliminary cleaning device before being fed between the cleaning disks and conveyed through the cleaning gap, wherein the preliminary cleaning device comprises a hollow cleaning cylinder with a first cleaning surface on its cylindrical inner surface, and a cleaning cylinder arranged in the hollow cleaning cylinder with a second cleaning surface on its cylindrical outer surface, wherein the cleaning surfaces delimit a cleaning gap between each other that is greater than the cleaning gap of the device subsequently used to remove impurities from the shredded plastic. The hollow cleaning cylinder and/or the cleaning cylinder are rotationally driven. The cleaning gap of the preliminary cleaning device can also be selected by adjusting the clearance between the hollow cleaning cylinder and the cleaning cylinder so that impurities removed from the shredded plastic during the preliminary cleaning are basically not destroyed.

Finally it is also possible to subject the shredded plastic to be cleaned to a preliminary cleaning in a preliminary cleaning device before being fed between the cleaning disks and conveyed through the cleaning gap, wherein the preliminary cleaning device comprises a hollow cleaning cone with a first cleaning surface on its conical inner surface, and a cleaning cone arranged in the hollow cleaning cone with a second cleaning surface on its conical outer surface, wherein the cleaning surfaces delimit a cleaning gap between each other that is greater than the cleaning gap of the device subsequently used to remove impurities from the shredded plastic. The hollow cleaning cone and/or the cleaning cone are rotationally driven. The cleaning gap of the preliminary cleaning device can also be selected by adjusting the clearance between the hollow cleaning cone and the cleaning cone so that impurities removed from the shredded plastic during the preliminary cleaning are basically not destroyed.

All of the aforementioned three alternative embodiments can in particular ensure that impurities such as cellulose removed from the shredded plastic during the primary cleaning are basically not destroyed, i.e., exist as an intact structure (such as cellulose fibers). These can then be easily removed from the process liquid, in particular from the process water, by means of filtration and/or straining. If impurities are in contrast excessively destroyed (e.g., cellulose fibers excessively crushed), they can only be removed by means of involved process water purification methods.

BRIEF DESCRIPTION OF THE SEVERAL VIEWS OF THE DRAWINGS

An exemplary embodiment of the invention is explained below in greater detail with reference to figures. They show schematically.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
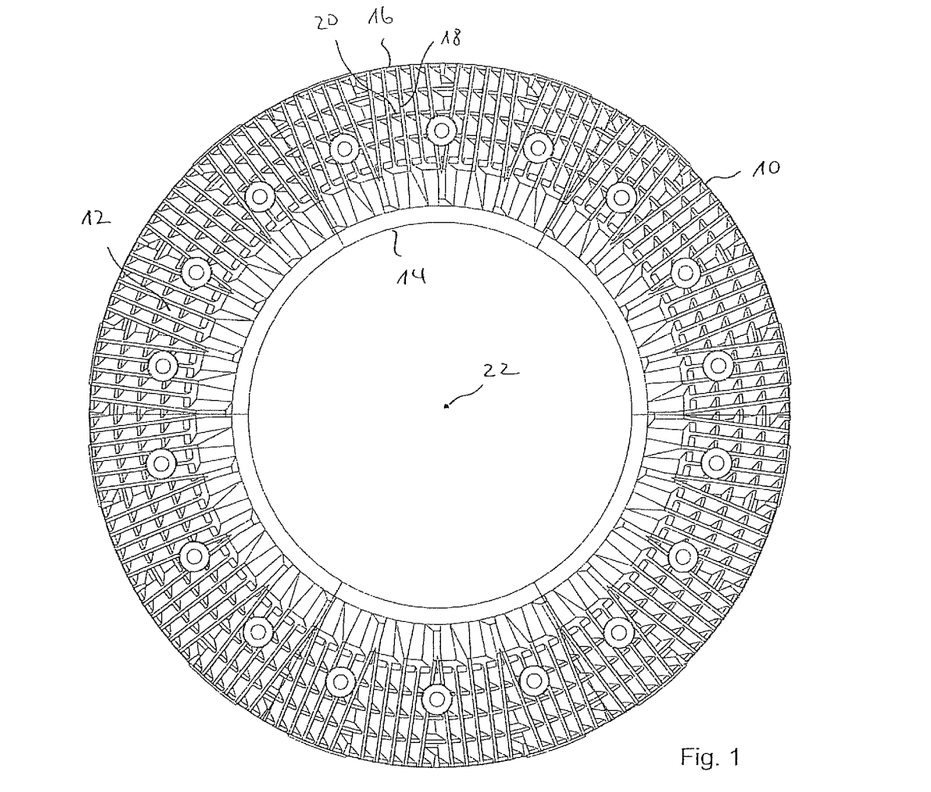
FIG. 1 a cleaning disk of a device according to the invention in a plan view.

If not otherwise specified, the same reference numbers indicate the same objects in the figures. FIG. 1 shows a bottom cleaning disk 10 of a device according to the invention in a plan view. The cleaning disk 10 possesses a hollow cylindrical basic shape and an annular cleaning surface 12. In the shown example, the cleaning disk 10 is composed of a plurality of cleaning disk segments. A plurality of cleaning ribs 18 extending between the inner edge 14 and outer edge 16 of the cleaning surface are arranged on the cleaning surface 12. It can be discerned that the cleaning ribs 18 of a cleaning disk segment are arranged substantially parallel to each other. Overall, the cleaning ribs 18 run in a radial direction of the cleaning disk, or at a slight angle to the radial direction. In the portrayed example, a plurality of cleaning bars 20 are arranged between all of the adjacent cleaning ribs 18 and extend transversally to the direction of extension of the cleaning ribs. The cleaning bars 20 are arranged along a plurality of concentric circular paths, five in the portrayed example, around the center of the cleaning disk 10, or respectively the cleaning surface 12. The design of the cleaning ribs 18 and the cleaning bars 20 can be seen in FIG. 3. In particular in FIG. 3, it can be seen that the cleaning ribs 18 each possess an angled first flank 24 relative to the rotational axis of the cleaning disk 10 portrayed in FIG. 1 with reference number 22. The first flank 24 terminates in a horizontal peak surface 26. The horizontal peak surface 26 in turn terminates in a second flank 28 of the cleaning ribs 18 that, in the portrayed example, lies in a vertical plane, i.e., not angled relative to the rotational axis 22 of the cleaning disk 10. In addition, it can be seen in FIG. 3 that the cleaning bars 20 each possess a surface 30 that, viewed in a radial direction, rises in a ramp-like manner which terminates in a peak surface 32 that is also horizontal. On the other hand, the surface 34 of the cleaning bars opposite the surface 30 is arranged in a nearly vertical plane. In conclusion, it can be seen in FIG. 3 that the height of the cleaning bars 20, in particular of their peak surfaces 32, is less than the height of the cleaning ribs 18, in particular of their peak surfaces 26. Because of the segmented design of the cleaning disk 10, the cleaning ribs alternately possess a gently rising start 36, or a steeply rising start 38 proceeding from the inner edge 14 of the cleaning disk 10.

Figure 2:
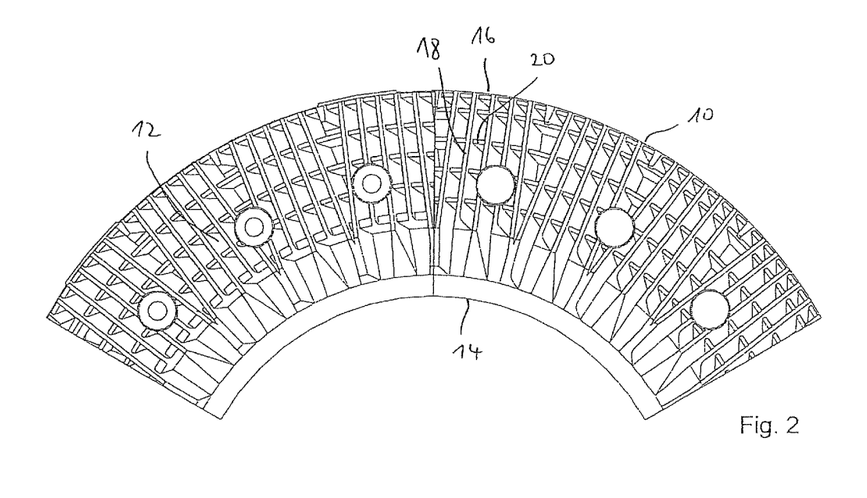
FIG. 2 an enlarged section of the cleaning disk from FIG. 1 in a plan view.
Figure 3:
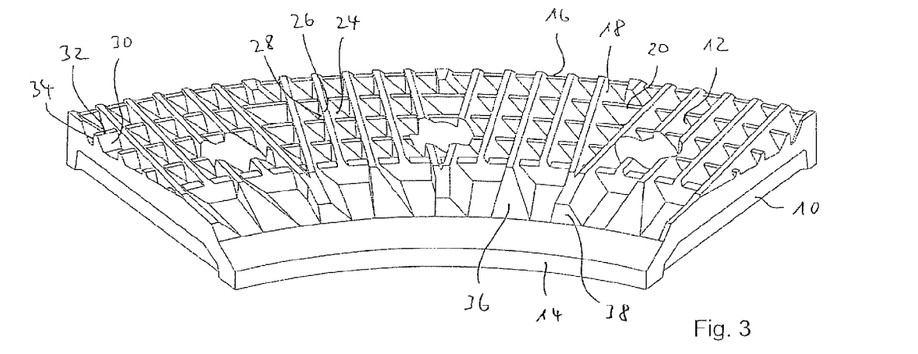
FIG. 3 an enlarged section of the cleaning disk from FIG. 1 in a perspective view, FIG. 4 a section of a first and second cleaning disk of a device according to the invention in a perspective view, FIG. 5 a part of a cross-sectional view of the cleaning disk from FIG. 1 in the radial direction, FIG. 6 a part of a cross-sectional view in a peripheral direction around the center of cleaning disks from FIG. 4, FIG. 7 the view from FIG. 6 in a first operating state, FIG. 8 the view from FIG. 6 in a second operating state, and FIG. 9 the view from FIG. 6 in a third operating state.
Figure 4:
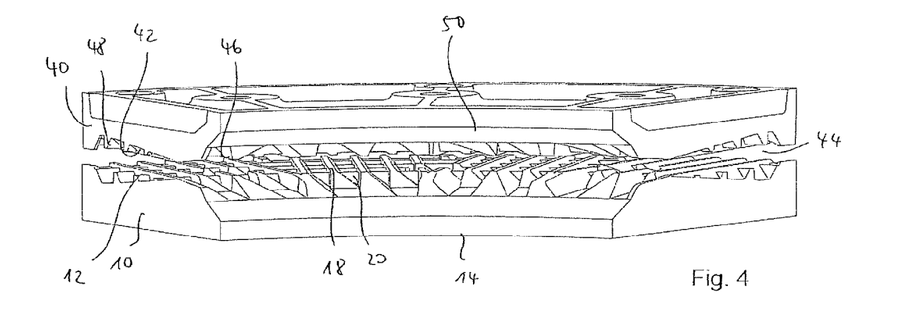

FIG. 4 depicts a section of the bottom cleaning disk 10 shown in FIGS. 1 to 3 in an operating position with a top cleaning disk 40. The design of the top cleaning disk 40 largely corresponds to the design of the bottom cleaning disk 10. The top cleaning disk 40 is hence also formed with a hollow cylindrical basic shape and possesses an annular cleaning surface 42. A cleaning gap 44 is correspondingly formed between the cleaning surfaces 12 and 42 of the bottom and top cleaning disk 10, 40. The cleaning surface 42 of the top cleaning disk 40 is also designed largely identical to the cleaning surface 12 of the bottom cleaning disk 10. In particular, the top cleaning surface 42 also possesses cleaning ribs 46 designed identical to the cleaning ribs 18 of the bottom cleaning disk 10. In addition, the top cleaning disk 40 also possesses a plurality of cleaning bars 48 that are between all of the adjacent cleaning ribs 46 and are in turn arranged along a plurality of concentric circular paths around the center of the top cleaning disk 40. However, the radii of the concentric circular paths of the top cleaning disk 40 differ from the radii of the concentric circular paths of the bottom cleaning disk 10, and the cleaning bars 20, 48 therefore do not assume a directly opposing position when there is a relative rotation between the cleaning disks 10, 40 during operation. A circular path with cleaning bars 20, or respectively 48, of the top and bottom cleaning disk 10, or respectively 40, is only provided on their outer edge, which cleaning bars directly oppose each other during operation and form the outer termination of the respective cleaning surfaces 12, 42. The device shown in FIG. 4 furthermore comprises a drive device (not shown) by means of which for example the top cleaning disk 40 can be rotated about its rotational axis. Furthermore, the device comprises a plastic feed device (also not shown) by means of which shredded plastic to be cleaned is fed centrally, i.e., over the inner edge 14 or respectively 50 of the cleaning disks 10, 40 into the cleaning gap 44. Finally, the device comprises a liquid feed device (also not shown) by means of which water is also fed centrally in the depicted example over the inner edge 14 or respectively 50 of the cleaning disks 10, 40 into the cleaning gap 44.

Figure 5:
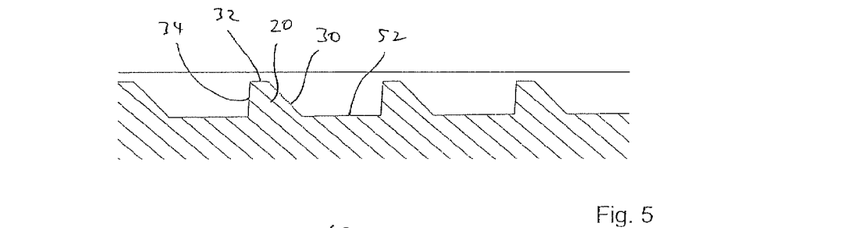

The geometric design of the cleaning bars 20 of the bottom cleaning disk 10 in the portrayed example can also be discerned in the cross-section view in a radial direction according to FIG. 5. In particular, the surface 30 rising in a ramp-like manner of the peak surface 32 and the vertical surface 34 are easily discernible. It is furthermore discernible that a horizontal base surface 52 is formed in each case between cleaning bars 20 arranged sequentially in a radial direction. The cleaning bars 48 of the top cleaning disk 40 are accordingly designed identical.

Figure 6:
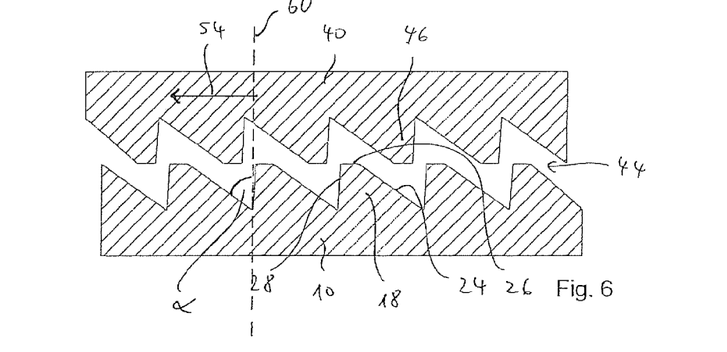

FIG. 6 shows a section of the device from FIG. 4 in a peripheral direction around the rotational axis 22 of the cleaning disk 10, or respectively around the coaxial rotational axis of the top cleaning disk 40. The first flank 24 of the cleaning ribs 18 of the bottom cleaning disk 10 at an angle to the rotational axes of the bottom and top rotational disk 10, 40 can also be seen. Furthermore, the horizontal peak surface 26 and vertical second flank 28 of the cleaning ribs 18 of the bottom cleaning disk 10 can also be seen. Furthermore, it can be seen in FIG. 6 that the cleaning ribs 18 are arranged in a direct sequence so that they produce a sawtooth profile in the cross-sectional view in FIG. 6. Finally, it can be seen that the cleaning ribs 46 of the top cleaning disk 40 is thus designed identical to the cleaning ribs 18 of the bottom cleaning disk 10. The rotational direction of the top cleaning disk 40 while being rotated by the drive device is illustrated in FIG. 6 by the arrow 54. It can be discerned that the flanks of the cleaning ribs 18, 46 angled relative to the rotational axis of the top, or respectively bottom cleaning disk 10, 40 are the front flanks during a rotation of the top cleaning disk 40. It should also be noted that the angled flanks of the cleaning ribs 18, 46 each possess an angle $\alpha$ greater than 45° relative to the axial direction of the cleaning disks 10, 40 portrayed with reference number 60 in FIG. 6. This makes available a comparatively large abrasive surface on the angled flanks which improves the cleaning effect. The axial direction 60 runs parallel to the rotational axis 22 of the cleaning disk 10.

Figure 7:
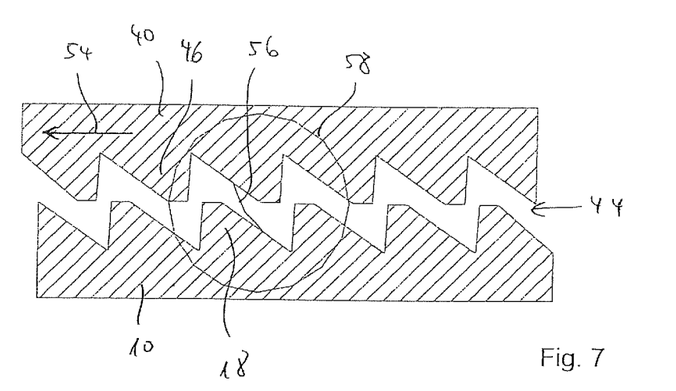
Figure 8:
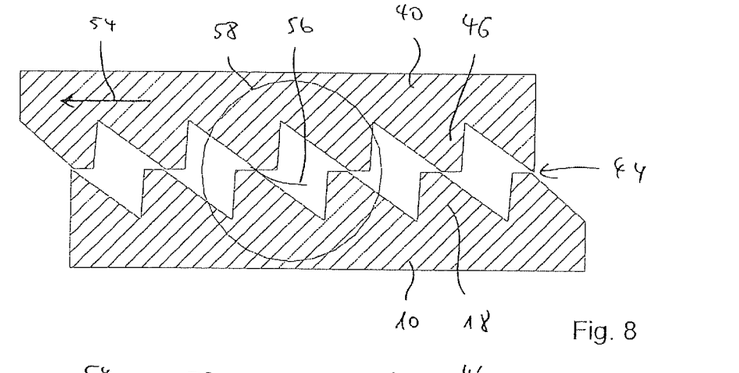
Figure 9:
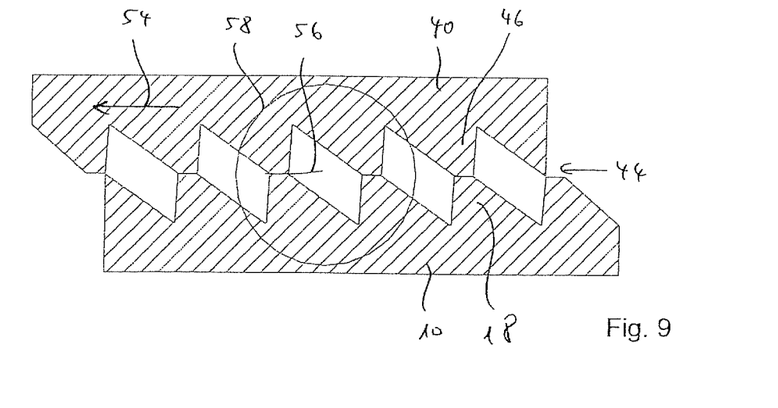

On the basis of the illustration in FIG. 6, the cleaning of shredded plastic 56, in particular a plastic flake 56, will be illustrated with reference to FIGS. 7 to 9. FIG. 7 shows the relative position of the cleaning disks 10, 40 to each other as shown in FIG. 6. The plastic flake 56 is located within the circle 58 shown in FIGS. 7 to 9 for reasons of illustration. In FIG. 7, the plastic flake 56 is in a free area between opposing cleaning ribs 18, 46 in a slightly kinked or respectively bent shape. During the rotary movement of the top cleaning disk 40 along the arrow 54, the plastic flake 56 then passes between the peak surfaces of the cleaning ribs 18, 48 as shown in FIGS. 8 and 9. The plastic flake 56 is thereby stretched and abrasively contacts the curved flanks and peak surfaces of the participating cleaning ribs 18, 46. This leads to an abrasion of impurities adhering to the surfaces of the plastic flake 56. This effect is enhanced by the very high flow speeds of the water conducted through the cleaning gap 44 arising from the geometry of the cleaning disks 10, 40.

It can also be provided that the shredded plastic to be cleaned is subject to preliminary cleaning in a cleaning device (not shown) before being fed between the cleaning disks (10, 40) and conveyed through the cleaning gap (44) of the device actually provided for removing impurities as explained above.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for removing impurities from shredded plastic (56) using an apparatus comprising a first cleaning disk (10) with a first cleaning surface (12) and a second cleaning disk (40) with a second cleaning surface (42), wherein the cleaning surfaces (12, 42) lie opposite each other and define amongst each other a cleaning gap (44), further comprising a drive device, with which at least one of the cleaning disks (12, 42) is rotatable around its rotational axis (22) and a feeding device, with which the shredded plastic 56 can be fed between the cleaning disks (10, 40), wherein the cleaning surfaces (12, 42) of the cleaning disks (10, 40) each have a plurality of cleanings ribs (18, 46) extending between an inner and an outer edge (14, 16) of the cleaning surfaces (12, 42), wherein at least one flank (24, 28) of the cleaning ribs (18, 46) is tilted or bent with respect to an axial direction of the respective cleaning disk (10, 40), several cleaning webs (20, 48) progressing transversely to an extension direction of the cleaning ribs (18, 46) are arranged between at least some of the adjacent cleaning ribs (18, 46) the cleaning webs (20, 48) of the first and/or second cleaning disk (10, 40) each rise in a ramp-like manner in a radial direction of the cleaning disks (10, 40) and the cleaning webs (20, 48) of the first cleaning disk (10, 40) have a lower height than the cleaning ribs (18, 46) of the first cleaning disk (10) and/or that the cleaning webs (20, 48) of the second cleaning disk ( 48) have a lower height than the cleaning ribs (18, 46) of the second cleanings disk (48), wherein said method includes the following steps:
at least one cleaning disk (10, 40) is rotationally driven about its rotational axis (22) by means of the drive device,
in which liquid, is fed into the cleaning gap (44) by means of a liquid feed device,
wherein shredded plastic (56) is fed into the cleaning gap (44) by means of the feeding device, and
wherein the shredded plastic (56) is conveyed through the cleaning gap (44).

2. The method according to claim 1, wherein shredded plastic to be cleaned undergoes a precleaning in a precleaning apparatus before being fed between the cleaning disks (10, 40) and before being conveyed through the cleaning gap (44) of the apparatus, wherein the precleaning apparatus comprises a first cleaning disk with a first cleaning surface and a second cleaning disk with a second cleaning surface, wherein the cleaning surfaces lie opposite each other and define amongst each other a cleaning gap, which is larger than the cleaning gap (44) of the apparatus used subsequent to the removal of impurities on the shredded plastic.

3. The method according to claim 1, wherein the shredded plastic to be cleaned undergoes a precleaning in a precleaning apparatus before being fed between the cleaning disks (10, 40) and before being conveyed through the cleaning gap (44) of the apparatus, wherein the precleaning apparatus comprises a first hollow cleaning cylinder with a first cleaning surface on its cylindrical inner surface, and a second cleaning cylinder arranged in the first hollow cleaning cylinder with a second cleaning surface on its cylindrical outer surface, wherein the cleaning surfaces of the cylinders delimit a cleaning gap between each other that is greater than the cleaning gap (44) of the apparatus used subsequent to the removal of impurities on the shredded plastic.

4. The method according to claim 1, wherein the shredded plastic to be cleaned undergoes a precleaning in a precleaning apparatus before being fed between the cleaning disks (10, 40) and before being conveyed through the cleaning gap (44) of the apparatus, wherein the precleaning apparatus comprises a first hollow cleaning cone with a first cleaning surface on its conical inner surface, and a second cleaning cone arranged in the first hollow cleaning cone with a second cleaning surface on its conical outer surface, wherein the cleaning surfaces of the cones delimit a cleaning gap between each other that is greater than the cleaning gap (44) of the apparatus subsequently used to remove impurities from the shredded plastic.

5. The method according to claim 2, wherein the cleaning gap of the precleaning apparatus is selected by adjusting a distance between the cleaning disks of the precleaning apparatus such that, in the course of the precleaning of the shredded plastic, removed impurities are not destroyed.

6. The method according to claim 3, wherein the cleaning gap of the precleaning apparatus is selected by adjusting a distance between the first hollow cleaning cylinder and the second cleaning cylinder such that, in the course of the precleaning of the shredded plastic, removed impurities are not destroyed.

7. The method according to claim 4, wherein the cleaning gap of the precleaning apparatus is selected by adjusting the distance between the first hollow cleaning cone and the second cleaning cone so that impurities removed from the shredded plastic during the precleaning are not destroyed.

8. The method according to claim 5, wherein the removed impurities are subsequently removed from the liquid by means of filtration.

\* \* \* \* \*